(12) United States Patent
Bozzone et al.

(10) Patent No.: US 7,026,789 B2
(45) Date of Patent: Apr. 11, 2006

(54) CHARGING SYSTEM FOR ELECTRONIC DEVICES

(75) Inventors: Stephen O. Bozzone, Lauderhill, FL (US); Ryan M. Nilsen, Pompano, FL (US); Joseph L. Dvorak, Boca Raton, FL (US); Sacha B. Holland, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 126 days.

(21) Appl. No.: 10/744,762

(22) Filed: Dec. 23, 2003

(65) Prior Publication Data

US 2005/0134215 A1    Jun. 23, 2005

(51) Int. Cl.
*H02J 7/00* (2006.01)

(52) U.S. Cl. .................................... 320/108; 320/112

(58) Field of Classification Search ................ 320/108, 320/112, 113, 115; 248/200, 683; 439/38–40; 355/21–22, 81–85
See application file for complete search history.

(56) References Cited

U.S. PATENT DOCUMENTS

| | | | |
|---|---|---|---|
| 3,810,258 A * | 5/1974 | Mathauser | 439/39 |
| 4,643,604 A * | 2/1987 | Enrico | 401/131 |
| 4,669,728 A * | 6/1987 | Carden | 463/22 |
| 4,865,285 A * | 9/1989 | Gaggianese | 248/309.4 |
| 5,138,245 A * | 8/1992 | Mattinger et al. | 320/115 |
| 5,473,242 A * | 12/1995 | McKenna | 320/113 |
| 5,600,225 A * | 2/1997 | Goto | 320/108 |
| 5,867,798 A * | 2/1999 | Inukai et al. | 455/573 |
| 5,973,677 A * | 10/1999 | Gibbons | 345/179 |
| 6,044,281 A * | 3/2000 | Shirai | 455/573 |
| 6,326,766 B1 * | 12/2001 | Small | 320/112 |

* cited by examiner

*Primary Examiner*—Karl Easthom
*Assistant Examiner*—Samuel Berhanu (57) ABSTRACT

Charging systems (10, 70) are disclosed that generally employ forces generated by at least one magnet (16–22) or (76–82) to guide and urge a rechargeable, portable or mobile electronic device (12, 72) toward a charging position with respect to a charging base (14, 74) therefor. By using magnetic forces to guide or urge the device (12, 72) to the charging position, substantially frictionless charging systems (10, 70) can be provided herein for shifting the device (12, 72) to its charging position. Either repulsion or attraction forces can be employed. Accordingly, depending on which magnetic force is used to urge the device (12, 72) to its charging position, an opposite magnetic force is preferably provided to provide the user a tactile indication of improper alignment of the device (12, 72) and charging base (14, 74). Preferably, pairs of opposite single pole magnets are used so that there is one pair (16, 18) or (76, 78) associated with the device (12, 72) and another pair (20, 22) or (80, 82) associated with the base (14, 74).

27 Claims, 6 Drawing Sheets

CHARGING SYSTEM FOR ELECTRONIC DEVICES

FIELD OF THE INVENTION

The invention relates to charging systems and, more particularly, to charging systems for portable electronic devices.

BACKGROUND OF THE INVENTION

In typical charging or recharging systems, there is either a charger plug that is to be inserted into a socket in the portable or mobile device to be charged or a charger base or cradle into which the device needs to be seated for charging to occur. With charger bases, charging contacts on the device are engaged with exposed charging contacts of the base such as in the form of compression connectors or pogo pin-type contacts. Usually there is also some sort of a latching mechanism including cooperating latching members and openings in the base and device that slidingly engage and can employ a camming or friction fit engagement therebetween. Accordingly, in either charging system there is the requirement that a user carefully, properly align the contacts with each other either by fitting the plug into the corresponding socket therefor or aligning the latching members and openings for latching engagement together. Some systems provide key and keyway guide structure that need be aligned to fit the device in its base.

Thus, generally known charging systems require some detailed attention for attaching the device to its charger. For many users this is less than desirable, particularly those with limited dexterity such as often occurs with the disabled or elderly. In other charging bases that do not utilize latching mechanisms or guiding structure and that simply employ the force of gravity to seat the device in the base, there is the disadvantage that the base cannot be mounted in different orientations such as along a vertical wall or upside down under a shelf, for example. Further, if gravity holds the device in place, the device is susceptible to misalignment or moving off of the charger contacts when the charger and/or device is bumped. Another problem of those chargers that employ latching mechanisms or guiding structure is that with frequent seating of the device on the base for charging and removal therefrom, engaging portions of the latching mechanism or guide structure can be susceptible to wear.

Accordingly, there is a need for a charging system that is easier to use. Further, a charging device that minimizes or avoids wear such as between engaging latching components or guide structure would be desirable.

DETAILED DESCRIPTION OF THE PREFERRED EMBODIMENTS

Preferred charging systems herein generally employ forces generated by magnets to guide and urge a rechargeable, portable or mobile electronic device toward a charging position with respect to a charging base therefor. Examples of mobile devices include cellular telephones, hand-held organizers or PDA's (personal digital assistants), e.g. Palm Pilot® devices, digital cameras, and the like. Generally, these devices will include a processor to provide signal or data processing capabilities and memory for data storage. In addition, they will normally include RF (radio frequency) circuitry to enable wireless communications with other such devices, particularly in the case of cellular telephones and certain PDA's.

By using magnetic forces to guide or urge the device to the charging position, substantially frictionless charging systems can be provided herein for shifting the device to its charging position. Either repulsion or attraction forces can be employed. Accordingly, depending on which magnetic force is used to urge the device to its charging position, an opposite magnetic force is preferably provided to provide the user a tactile indication of improper alignment of the device and charging base. Preferably, pairs of opposite single pole magnets are used so that there is one pair associated with the device and another pair associated with the base. It is also contemplated that where magnets already reside in the device that these may be able to be employed to generate the desired magnetic urging or guiding force such as associated with a transducer and/or high audio speaker in a push-to-talk (PTT) phone device. Charging contacts of the device and base can be either separate from or integrated with the single pole magnets. The magnets can be permanent magnets or electromagnets.

In one form, the system employs the repulsion forces generated between the magnets of the device in the base, and the base includes restraining arms configured so that the device has be turned to bring the magnets into alignment for allowing the repulsion force to urge the device to the charging position thereof. In another form, the attraction forces generated between magnets of the device and the base are employed, and the contacts of the base are preferably biased to a spaced position relative to corresponding power plates so that exposed live contacts on the base are avoided.

Figure 1:
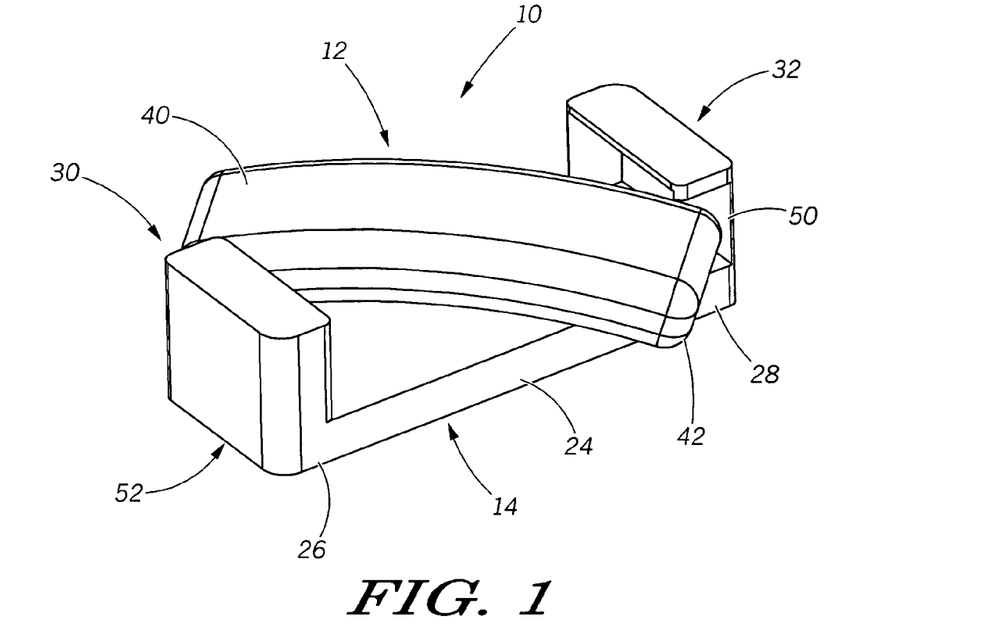
FIG. 1 is a perspective view of a charging system in accordance with one aspect of the present invention showing a portable, rechargeable electronic communication device and a charging base.
Figure 2:
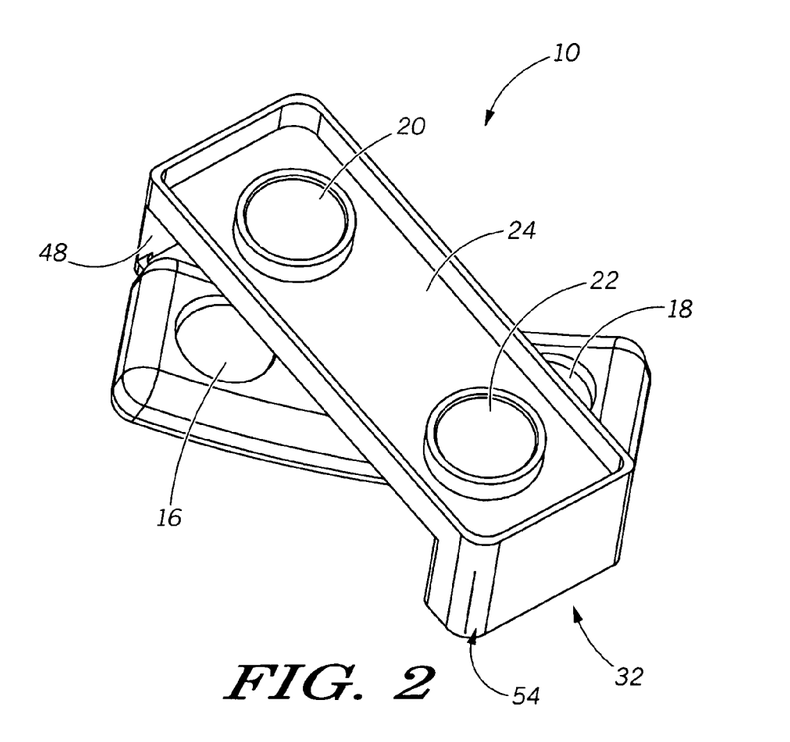
FIG. 2 is a bottom perspective view of the charging system of FIG. 1 showing magnets of the device and charging base.
Figure 3:
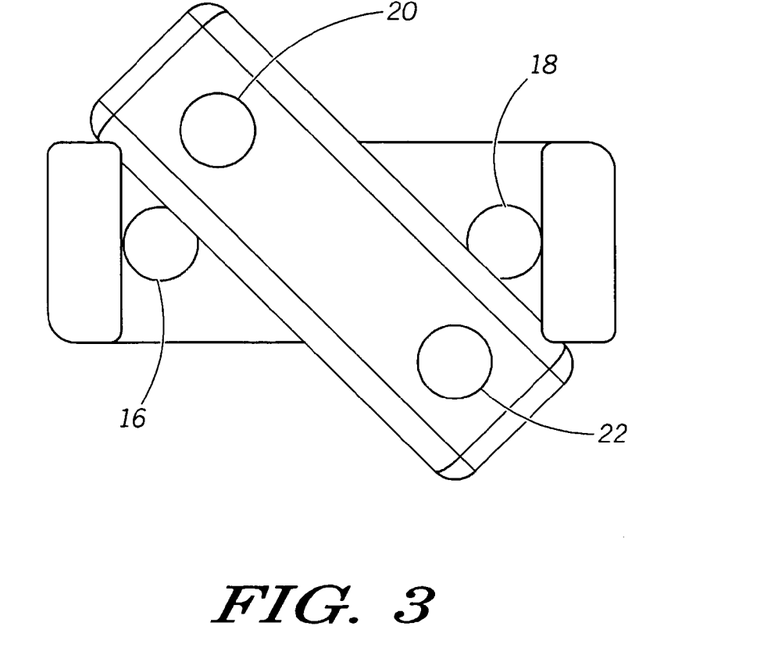
FIG. 3 is a bottom plan view of the charging system of FIG. 1 showing the device turned so that its magnets are out of alignment with the magnets of the base.
Figure 4:
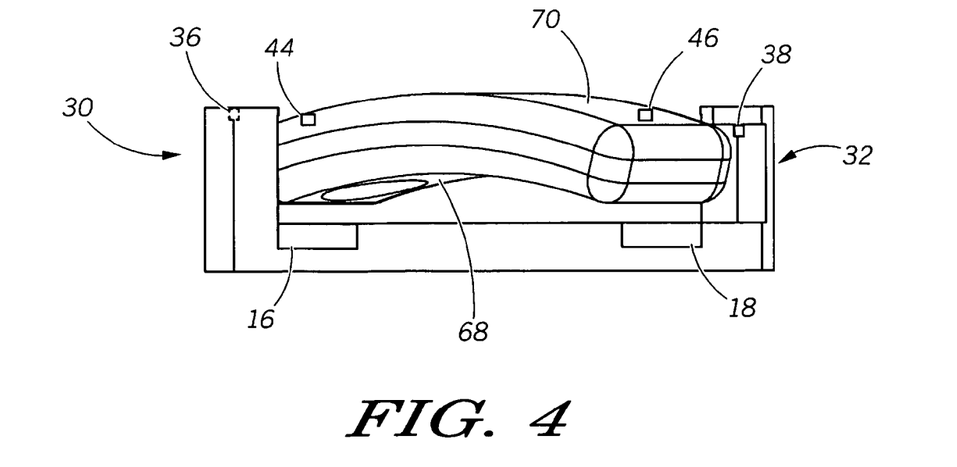
FIG. 4 is a side elevation view of the charging system showing upstanding retaining arms of the charging base having openings into which end portions of the communication device can be turned for aligning charging contacts of the device and base.

Referring now to FIGS. 1 and 2, a charging system 10 in accordance with one aspect of the present invention is illustrated. As can be seen, the charging system 10 includes a rechargeable, electronic communication device such as in the form of a mobile phone 12, e.g. cellular or satellite based network systems, or both, and charging device in the form of charging base 14. As is known, the cell phone includes a power source such as in the form of a rechargeable battery (not shown) that provides power to the phone 12 when used and disconnected from the base 14. To recharge the battery of the phone 12, the charging base 14 is connected to a power supply such as by being plugged into an electrical outlet and the base 14 supplies charging current to the battery power source of the phone 12 with the phone 12 in a predetermined recharging position (FIG. 5) relative to the base 14.

To urge the phone 12 to the recharging position, at least one magnet and preferably a pair of single pole magnets 16 and 18 having opposite polarities are employed with the phone 12. Similarly, the base 14 also has a pair of single pole magnets 20 and 22 of opposite polarities from each other. In the charging system 10, a repulsion force generated by the magnets 16–22 is utilized to urge the phone 12 to its charging position. In this regard, the magnets 16 and 20 are of the same polarity and the magnets 20 and 22 are of the same polarity so that when facing each other, a magnetic repulsion force is generated therebetween.

The base 14 will next be described in the illustrated orientation, although it will be recognized that it can be employed in various orientations as the charging system 10 does not rely on the force of gravity to seat the phone 12 in its charging position and rather employs magnetic force, and specifically a repulsion force as described above. In fact, in the illustrated orientation, the repulsion force is generally opposite to the force of gravity so the phone 12 is in a levitating state relative to the base 14 when in its charging position, as described further hereinafter.

Figure 5:
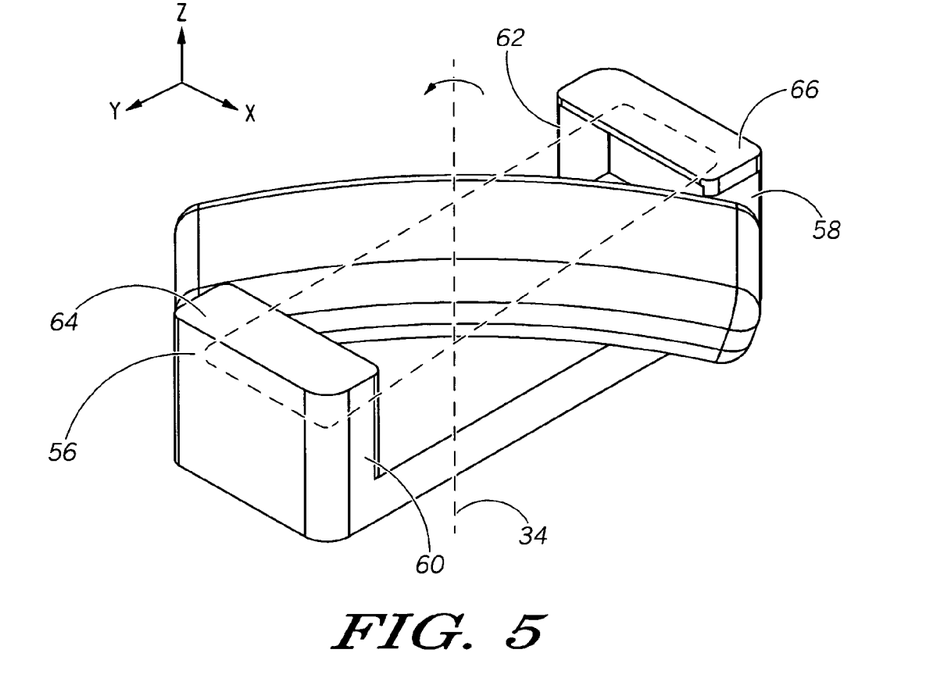
FIG. 5 is a perspective view of the charging system similar to FIG. 1 showing the device in phantom turned about an axis to its charging position relative to the base.
Figure 6:
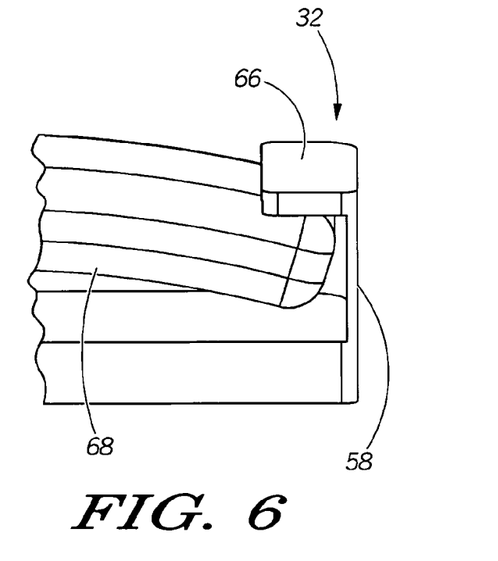
FIG. 6 is a side view of an end portion of the device pushed against a retaining arm of the base with the device in the charging position.
Figure 7:
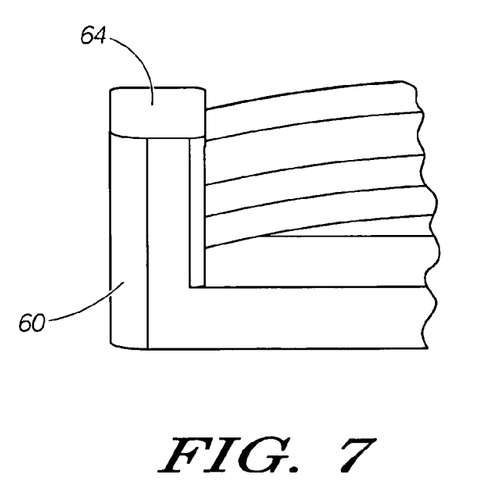
FIG. 7 is a side view of the other end portion of the device pushed against the other base retaining arm with the device in the charging position.
Figure 8:
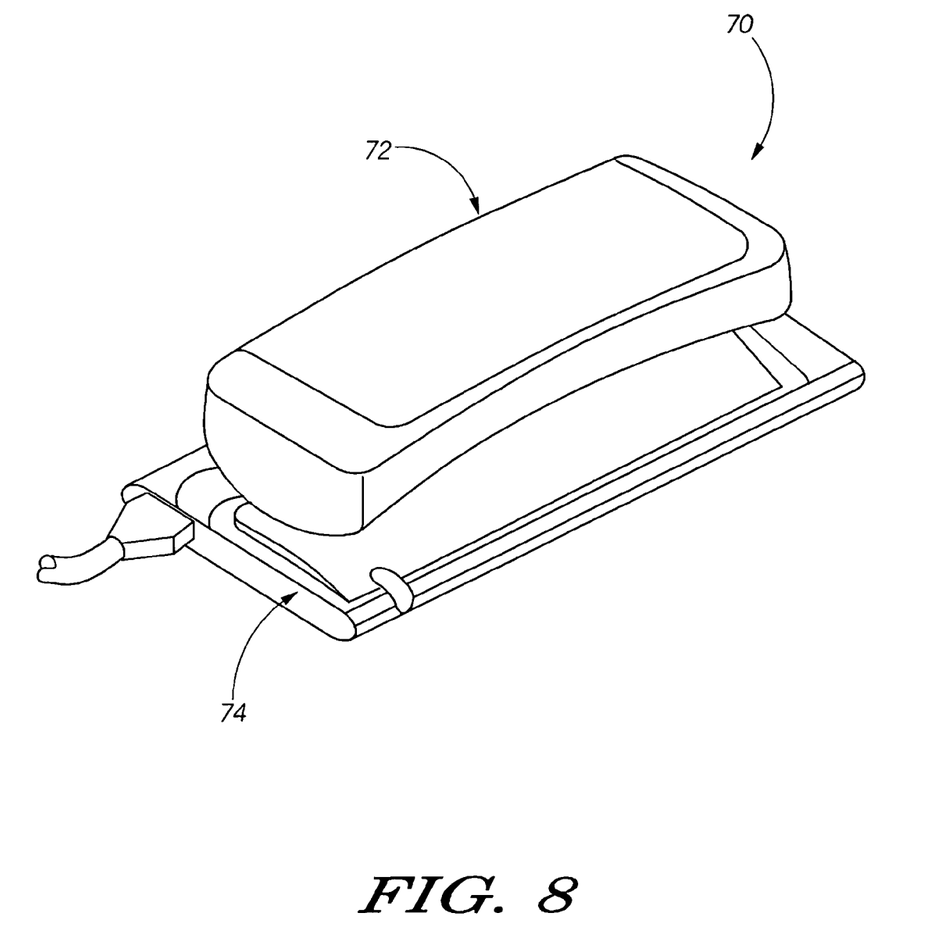
FIG. 8 is a perspective view of a charging system in accordance with another aspect of the present invention showing a portable, rechargeable electronic communication device and a charging base.

More particularly, the base 14 includes an elongate lower wall 24 that extends between opposite ends 26 and 28 thereof. At the wall ends 26 and 28 are respective retaining walls or arms 30 and 32 upstanding from the lower wall 24 as seen in FIGS. 4–7. The retaining arms 30 and 32 are configured to constrain the phone 12 from movement in x, y and z directions when in its recharging position absent a rotary or turning force applied to the phone 12 about an axis 34, as can be seen in FIG. 5. In addition, the retaining walls 30 and 32 can each include a respective charging contact 36 and 38 electrically connected to the charging circuitry of the base 14. Corresponding end portions 40 and 42 of the phone 12 are provided with contacts 44 and 46 electrically connected to the rechargeable battery thereof and which are brought into electrical communication with the contacts 36 and 38, such as by engagement therewith when the phone 12 is in its recharging position. In this regard, the contacts 36 and 38 and 44 and 46 can be of any known type such as compression contacts or pogo pin-type contacts.

In the preferred and illustrated form, the end walls form oppositely facing openings 48 and 50 that allow the phone end portions 40 and 42 to be turned toward and away from the charging position thereof. In the charging position, the end walls 30 and 32 are configured to restrain the phone in three axes of movement, as previously mentioned. For this purpose, each of the retaining walls or arms 30 and 32 include a generally L-shaped wall or wall portion 52 and 54 extending upwardly from either end 26 and 28 of the lower wall 24. Each wall 52 and 54 includes a respective end wall portion 56 and 58 that cooperate to constrain movement of the phone 12 in the y-axis of movement. At the foot of the walls 52 and 54 are sidewall portions connected and extending perpendicular to the respective end wall portions 56 and 58 on opposite sides of the lower wall 24. In this manner, the L-shaped walls 52 and 54 have generally opposite orientations and cooperate to form the oppositely facing side openings 48 and 50 of the base 14. The sidewall portions 60 and 62 cooperate to constrain movement of the phone 12 in the x-axis direction.

Upper wall or wall portions 64 and 66 are provided that extend along the tops of the respective L-wall portions 56 and 60, and 58 and 62. Accordingly the wall portions 64 and 66 are spaced in the z-axis direction from the lower wall portion 24 and thus constrain movement of the phone 12 in the charging position in the z-axis direction of movement. In addition, with the magnets 16 and 18 mounted to the base lower wall 24, the upper wall portions 64 and 66 are disposed in interference with the phone end portions 40 and 42 turned through the side openings 48 and 50 so that the length of the phone 12 is generally aligned with the length of the base 24 such that the repulsion force generated by the magnets 16, 18 and 20, 22 pushes the phone 12 toward the upper wall portions 64 and 66 in the z-axis direction. Accordingly, the phone magnets 20 and 22 are disposed such that there is a repulsion force generated between the base wall 24 and the facing surface 68 of the phone 12. In this manner, the opposite surface 70 of the phone 12 is urged toward the upper wall portions 64 and 66 in facing relation therewith, at the end portions 40 and 42 of the phone 12.

The wall portions 64 and 66 have a relatively large spacing therebetween along the length of the lower wall 24 so that a user can hold the phone 12 therebetween and orient it in the position illustrated in FIGS. 1–5, i.e. with the phone length skewed relative to the length of the base, and then turn it to an aligned position with the base 14. With the phone 12 and base 14 so aligned, the magnets 16, 18 and 20, 22 are also in general alignment so that the magnetic repulsion force pushes the phone to the charging position with the charging contacts 36 and 38 and the phone contacts 44 and 46 in engagement with one another. In this position illustrated in phantom in FIG. 5 and shown in FIGS. 6 and 7, the phone surface 68 facing the lower wall 24 will actually be spaced therefrom so as to create a levitating effect to the phone 12 when in its recharging position.

Thus, with the present charging system 10, all a user needs to do to put the phone 12 in the charging position is to orient the phone 12 adjacent the base 14 with the phone end portions 40 and 42 adjacent the corresponding base side openings 48 and 50 therefor. Then, the user need only turn the phone 12 about axis 34 so that the phone end portions 40 and 42 enter through the openings 48 and 50 such as until they abut the sidewall portions 60 and 62 of the charging base 14. At this point, the repulsion force provided by the magnets 16–22 will take over and push the phone to its charging position. In this manner, the user does not have to carefully align guiding structure and/or the charging contacts 36, 38 and 44, 46 with each other as required with many prior charging bases. Moreover, it is apparent that with the configuration of the base 14 that the phone 12 can be turned without having any of its surfaces in significant rubbing engagement against surfaces of the base 14 and still be shifted to its charging position. Thus, the user can shift the phone 12 to its charging position in a substantially frictionless manner.

It is also apparent that the charging base can be mounted via any of its walls to surfaces in different orientations without concern that gravity will cause the phone to shift from the charging position as the magnetic repulsion force is strong enough to keep it in the charging position despite any counteracting forces due to gravity that would otherwise tend to pull the phone 12 away from the charging position. Accordingly, the base can be mounted with the lower wall 24 serving as a mounting wall to a horizontal surface so that it is in a generally horizontal orientation as illustrated. Alternatively, the base 14 can be mounted to a vertical wall via the wall 24 with the magnetic repulsion force effective to keep the phone 12 in its charging position. Similarly, the charging base can be oriented with its lengthwise extent running vertically by mounting underneath a ledge or the like via either one of the end wall portions 56 and 58 to serve as a mounting wall for the base 14. The base 14 can also be mounted upside down with the wall 24 mounted underneath a ledge for instance and in this case, the repulsion force would act in concert with gravitational forces tending to pull the phone 12 toward the wall portions 64 and 66 and the charging position. Manifestly, the base 14 can be oriented in any desired orientation and still not compromise the ability of the phone 12 to remain in the desired charging position therefor.

Another advantage provided by the charging system 10 is that a user can remove the phone 12 from the charging base 14 in a much easier manner than with prior bases that employ friction fits and latching mechanisms whose holding force must be overcome to remove the phone from the charging base. Instead, the user simply grips the phone between the wall portion 64 and 66 and exerts a slight turning force in the opposite direction to the force exerted about axis 34 to bring the phone 12 into alignment with the base 14. With the opposite turning force about axis 34, the phone can be shifted to its skewed position relative to base 14 so that the magnets 20 and 22 thereof are no longer in alignment with the charger base magnets 16 and 18, as shown in FIGS. 1–5. On the other hand, the phone 12 will tend to remain in the base in the charging position even if impacted due to the configuration thereof, and specifically the retaining arms 30 and 32 as previously described. Unless a turning force about axis 34 is applied to the phone which an accidental impact will rarely do, the phone will be retained in the base 14 in its charging position via the lower wall 24 and the upstanding retaining arms 30 and 32 at either end thereof.

Another charging system 70 in accordance with the present invention will next be described with reference to FIGS. 8–12. The charging system 70 similar to charging system 10 is for a mobile, rechargeable electronic device such as the illustrated wearable communication device or phone 72 (FIG. 11) adapted for hands-free voice communication with another like device. The charging system 70 includes a charging base 74 (FIG. 12) that includes charging circuitry for recharging the power source or rechargeable battery (not shown) of the phone 72 with the phone 72 in the charging position relative to the base 74. Similar to charging system 10, the charging system 70 uses magnetic force to urge the phone 72 toward its charging position. However, in the charging system 70 it is a magnetic attractive force that is employed between the phone 72 and the charging base 74 for this purpose. For providing the attractive force, in the preferred and illustrated form the phone and base are provided with single pole magnets including phone magnets 76 and 78 and corresponding charging base magnets 80 and 82, respectively.

More particularly, it can be seen that the charging base has a body 84 having a substantially flat, plate-like configuration and lacks the retaining arms 30 and 32 of the previously described base 14 as the phone 72 is simply drawn toward the upper surface 86 of the base body 84 by the attractive magnetic force for guiding the phone 72 to its charging position. Similar to charging system 10, charging system 70 also allows for very little effort to be exerted by the user to place the phone 72 in its charging position. Instead, the user merely places the phone 72 adjacent to the base body 84 with end portions 88 and 90 of the phone 72 generally aligned with corresponding end portions 92 and 94 of the base body 84, and the attractive force between the phone magnets 76, 78 and base magnets 80, 82 will draw or pull the phone 72 into its charging position. In this regard, it should be noted that the magnets 76 and 80 are of opposite polarity and the magnets 78 and 82 are of opposite polarity so that an attractive force is generated therebetween. Accordingly, the system 70 also provides the user a tactile indication of when the phone 72 is misaligned with the charging base 74 so as to avoid accidental and improper placement of the phone 72 on the base 74. If the phone end portions 88 and 90 are aligned with the base end portions 94 and 92, respectively, such that like pole magnets 76, 82 and 78, 80 are aligned, the repulsion force will provide a tactile indication to the user to rotate the device 180 degrees to align the phone 72 properly with respect to the charging base 74. In addition, it can be seen that the charging system 70 is frictionless in terms of forces encountered by the user in placing the phone 72 in its charging position.

With the phone properly aligned and the magnetic attractive force operable to draw the phone 72 toward the base 74, charging contacts 96 and 98 of the charging base 74 electrically connected to the base charging circuitry will be in electrical communication with corresponding contacts 100 and 102 of the phone 72 as by contact therebetween. As shown, the base contacts 96 and 98 can be embedded in corresponding magnets 80 and 82 of the base 74. Similarly, the phone contacts 100 and 102 can be embedded in the phone magnets 76 and 78. Alternatively, the contacts can be distinct and spaced from the magnets, or the magnets can be electromagnets and used as the charging contacts themselves.

Figure 9:
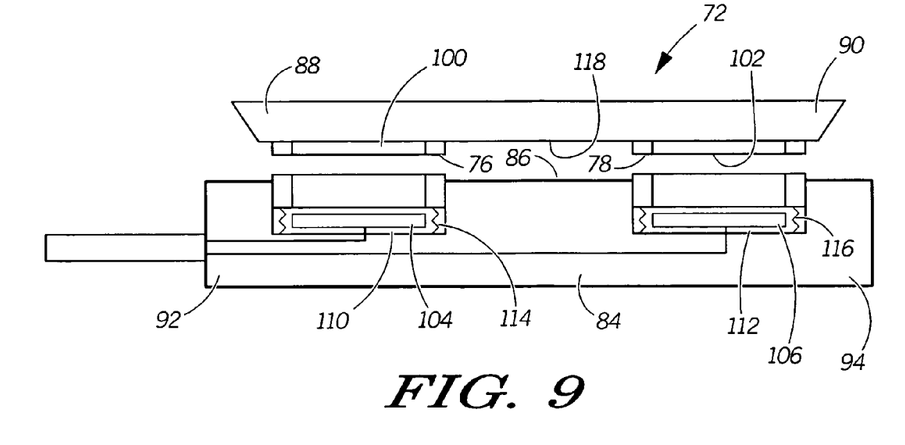
FIG. 9 is a side elevational view of the charging system of FIG. 8 showing magnets of the device and magnets and spaced apart power contacts of the charging base.
Figure 10:
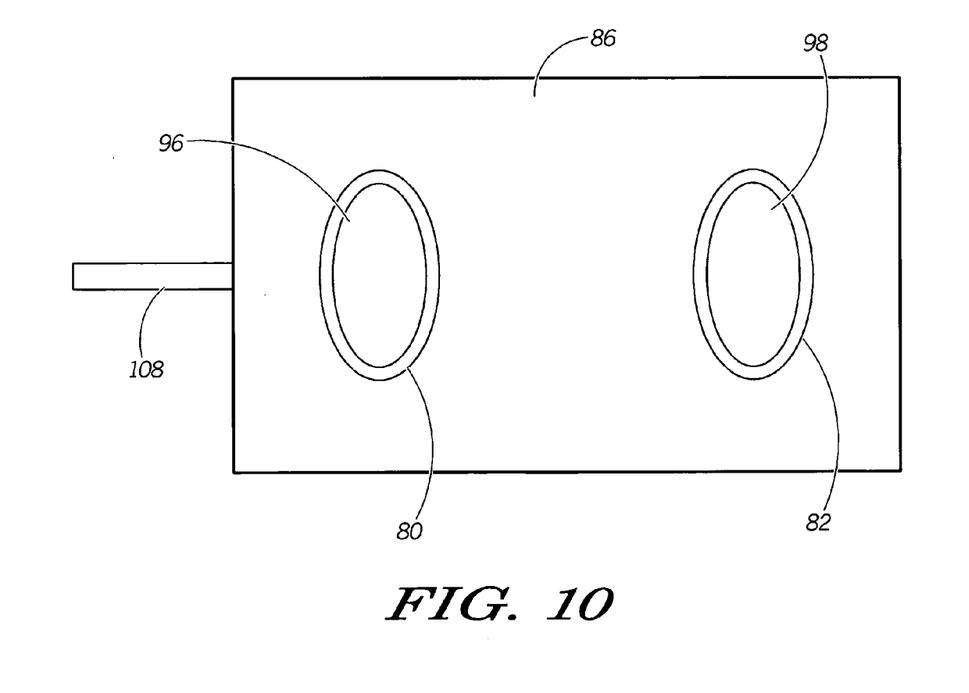
FIG. 10 is a plan view of the charging base showing charging contacts embedded in the magnets of the base.
Figure 11:
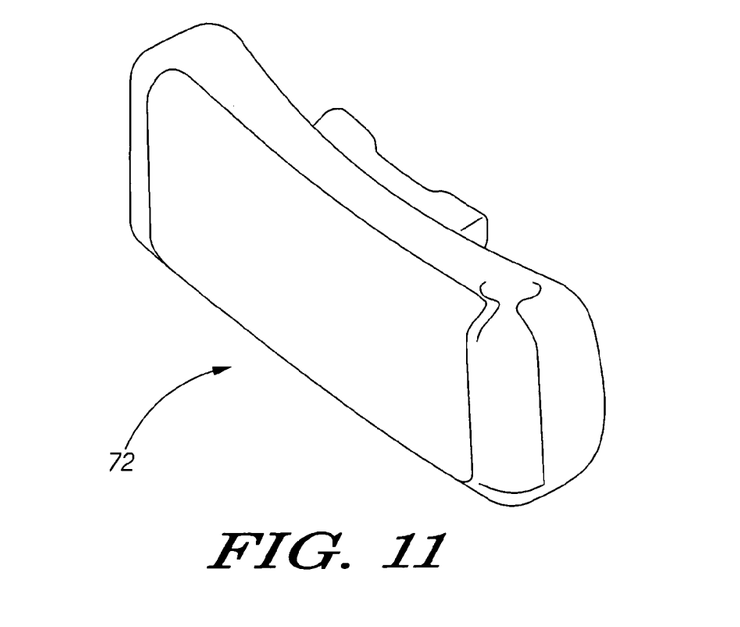
FIG. 11 is a perspective view of the device in the form of a wearable communication device.
Figure 12:
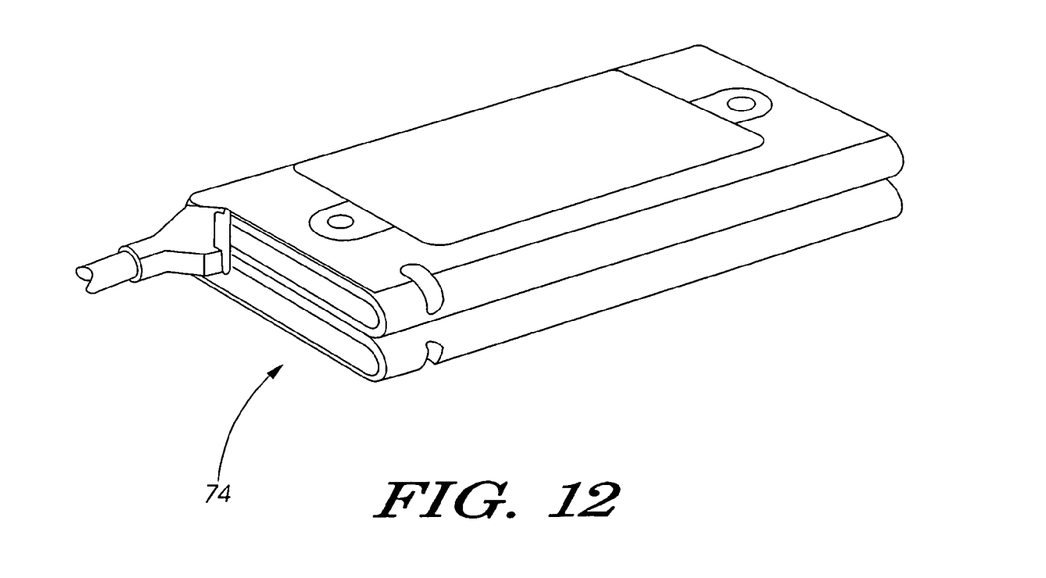
FIG. 12 is a perspective view of the charging base.

Referring more specifically to FIGS. 9 and 10, the base charging contacts 96 and 98 are shown in one form as including a bias so that they are urged into spaced relation with corresponding power contacts 104 and 106, respectively. In this form, the power contacts 104 and 106 are always "live" or energized when the base is connected to a more permanent power source such as via power cord 108 plugged into a wall outlet or the like. By biasing the contacts 96 and 98 to a spaced or non-conducting position relative to the live contacts 104 and 106, the base 74 avoids having exposed live contacts. When the phone 72 is drawn to its charging position on the base body 84, the weight of the phone 72 is sufficient to overcome the bias force separating the respective contact pairs 96 and 104 and 98 and 106 so that the charging contacts 96 and 98 are in an engaged and conducting position with the corresponding power contacts 104 and 106, and the phone 72 can undergo recharging by the charging base 74.

To this end, the base body 84 can include a pair of recessed wells 110 and 112, and the magnets 80 and 82 and corresponding embedded charging contacts 96 and 98 are biased to their non-conducting positions by springs 114 and 116, respectively. As can be seen in FIG. 9, the springs 114 and 116 urge the magnets 80 and 82 and corresponding charging contacts 96 and 98 upwardly so that the contacts 96 and 98 are in spaced relation with the power contacts 104 and 106 spaced therebelow in the wells 110 and 112. While the springs 114 and 116 can bias the magnets 80 and 82 and embedded contacts 96 and 98 to a position above the plate surface 86 as shown in FIG. 9, the top surface of the magnets and embedded contacts also can be aligned with the surface 86 of the base body so as to be flush therewith. Similarly, the phone 72 can have the magnets 76 and 78 in corresponding embedded contacts 100 and 102 projecting from the phone surface 118 facing the base surface 86, and alternatively the magnets and embedded contacts 100 and 102 can be flush with the phone surface 118.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A charging system comprising:
a portable electronic communication device;
a power source of the electronic device;
a charging device for supplying charging current to the power source with the portable device in a predetermined charging position relative to the charging device; and
a magnet associated with at least one of the devices for generating a repulsive magnetic force that urges the portable device to the predetermined charging position thereof.

2. The charging system of claim 1 wherein the charging device comprises a charging base having a predetermined configuration that allows a user to shift the electronic device relative to the base in a substantially frictionless manner with the magnetic force guiding the device to the charging position thereof.

3. The charging system of claim 1 wherein the portable and charging devices include charging contacts that are in electrical communication for transfer of charging current from the charging device to the portable device with the portable device in the predetermined charging position.

4. The charging system of claim 1 wherein the magnet comprises magnets associated with the portable and charging devices.

5. The charging system of claim 1 wherein both the portable device and charging device include magnets having opposite poles with like poles of the magnets of the devices being aligned with the portable device in the predetermined charging position.

6. The charging system of claim 1 wherein the portable device includes generally opposite surfaces and in the predetermined charging position the charging device includes walls facing the opposite surfaces with the repulsive force generated between one of the charging device walls and the facing portable device surface urging the opposite surface of the portable device toward another one of the charging device walls that faces the opposite surface.

7. The charging system of claim 6 wherein the charging device has spaced walls which includes the other one of the charging device walls toward which the portable device opposite surface is urged to allow a user to hold the portable device generally between the spaced walls for shifting the portable device toward and away from the charging position.

8. The charging system of claim 1 wherein the magnetic force also comprises an attractive magnet force.

9. The charging system of claim 8 wherein both the portable device and the charging device include magnets having opposite poles with opposite poles of the magnets of the devices being aligned with the portable device in the predetermined charging position.

10. The charging system of claim 1 wherein the magnet associated with one of the devices includes a charging contact, and the other device includes a charging contact so that with the portable device in the predetermined charging position, the charging contacts are in electrical communication for transfer of charging current from the charging device to the portable device.

11. The charging system of claim 1 wherein the portable electronic communication device includes circuitry for enabling wireless communication with other devices.

12. A charging system comprising:
a mobile electronic device;
a charging base that supplies charging current to the electronic device with the device in a predetermined charging position relative to the base;
magnets of the device and base that generate a repulsion force therebetween for urging the device to the predetermined charging position; and
charging contacts of the device and base that are in electrical communication for transfer of charging current to the electronic device with the device in the predetermined charging position.

13. The charging system of claim 12 wherein the base has a predetermined configuration such that the device is turned toward and away from the charging position.

14. The charging system of claim 12 wherein the base has opposite ends and restraining arms at the opposite ends configured to keep the device in the predetermined charging position against shifting away therefrom absent a rotary force applied to the device.

15. The charging system of claim 14 wherein the device has end portions positioned adjacent to the opposite ends of the base with the device in the charging position, and the charging contacts of the device and base are at the device end portions and the base restraining arms.

16. The charging system of claim 12 wherein the base includes a mounting wall with the repulsion force generated by the magnets allowing the mounting wall to be mounted in various orientations without causing the device to shift from the predetermined charging position thereof.

17. The charging system of claim 12 wherein the base comprises an elongate lower wall having opposite ends, generally L-shaped wall portions upstanding in generally opposite orientations from each other at either end of the lower wall, and small upper wall portions extending along the L-shaped wall portions spaced laterally from each other and above the elongate lower wall, the base magnets being associated with the lower wall so that the repulsion force pushes the device toward the upper wall portions, and the L-shaped wall portions form oppositely facing openings so that the device has to be turned with end portions thereof shifting through the openings to shift the device magnets into alignment with the base magnets.

18. A method of charging a portable electronic device, the method comprising:
orienting the portable device adjacent a recharging base;
magnetically urging the device toward a predetermined charging position relative to the base in a substantially frictionless manner, wherein the device is magnetically urged by a repulsive force; and
supplying the device with charging current via the base with the device in the predetermined charging position.

19. The method of claim 18 wherein the portable device is oriented by turning the device relative to the base.

20. The method of claim 18 wherein the portable device is oriented by bringing magnets on the device and base into substantial alignment.

21. The method of claim 20 wherein the magnets are single pole magnets and the magnets are aligned by aligning like pole magnets of the device and base with each other to generate a magnetic repulsion force therebetween, and the device is magnetically urged by pushing the device toward charging contacts of the base via the magnetic repulsion force.

22. The method of claim 18 including mounting the base in any one of a plurality of orientations with the device magnetically urged toward the charging position with sufficient force to overcome gravitational forces that would otherwise pull the device away from the charging position depending on the mounting orientation of the base.

23. A mobile electronic device that is rechargeable when disposed in a predetermined charging position relative to a charging base therefor, the mobile electronic device comprising:
 a power source of the device;
 charging contacts of the device for receiving charging current from the charging base and transmitting the charging current to the power source with the device in the predetermined position; and
 at least one magnet of the device for generating a magnetic force that repulsively urges the mobile electronic device to the predetermined charging position.

24. The mobile electronic device of claim 23 wherein the at least one magnet comprises a pair of magnets having opposite poles from each other.

25. The mobile electronic device of claim 23 including circuitry for enabling wireless communication with other devices.

26. A charging base for recharging a mobile electronic device when disposed in a predetermined charging position relative to the base, the charging base comprising:
 charging circuitry of the charging base;
 charging contacts electrically connected to the charging circuitry for supplying the device with charging current; and
 at least one magnet of the base for generating a magnetic force that repulsively urges the mobile electronic device to the predetermined charging position.

27. The charging base of claim 26 wherein the at least one magnet comprises a pair of magnets having opposite poles from each other.

* * * * *